(12) United States Patent
Damstra et al.

(10) Patent No.: US 8,526,776 B2
(45) Date of Patent: Sep. 3, 2013

(54) METHOD FOR RECORDING DATA, METHOD FOR RETRIEVING SETS OF DATA, DATA FILE, DATA STRUCTURE AND MEDIUM CARRYING SUCH DATA

(75) Inventors: Nicolaas Johannes Damstra, Breda (NL); Robert C. Edge, Tualatin, OR (US)

(73) Assignee: Thomson Licensing, Boulogne-Billancourt (FR)

( * ) Notice: Subject to any disclaimer, the term of this patent is extended or adjusted under 35 U.S.C. 154(b) by 1245 days.

(21) Appl. No.: 10/537,463

(22) PCT Filed: Nov. 21, 2003

(86) PCT No.: PCT/EP03/50869
§ 371 (c)(1),
(2), (4) Date: Jun. 3, 2005

(87) PCT Pub. No.: WO2004/054267
PCT Pub. Date: Jun. 24, 2004

(65) Prior Publication Data
US 2006/0153524 A1    Jul. 13, 2006

(30) Foreign Application Priority Data
Dec. 6, 2002  (EP) .................................... 02293016

(51) Int. Cl.
*H04N 5/765*  (2006.01)
*H04N 5/931*  (2006.01)
(52) U.S. Cl.
USPC ........................................................ 386/200

(58) Field of Classification Search
USPC .............................................................. 386/46
See application file for complete search history.

(56) References Cited

U.S. PATENT DOCUMENTS

| 4,210,961 | A | * | 7/1980 | Whitlow et al. ..................... 1/1 |
| 4,633,391 | A | * | 12/1986 | Rundell .......................... 707/700 |
| 7,149,750 | B2 | * | 12/2006 | Chadwick ................. 707/103 R |
| 2002/0009172 | A1 | * | 1/2002 | Cornog et al. ................ 375/377 |
| 2002/0164149 | A1 | * | 11/2002 | Wilkinson ....................... 386/46 |
| 2002/0171959 | A1 | * | 11/2002 | Yanagita et al. ............... 360/46 |

FOREIGN PATENT DOCUMENTS

| EP | 0794667 | 9/1997 |
| EP | 1148728 | 10/2001 |
| WO | WO 02/21845 | 3/2002 |

OTHER PUBLICATIONS

J. Wilkinson: "The SMPTE Data Coding Protocol and Dictionaries", SMPTE Journal, SMPTE Inc. Scarsdale, NY, US, vol. 109, No. 7 Jul. 2000, pp. 579-586.
Search Report Dated Dec. 16, 2004.

\* cited by examiner

*Primary Examiner* — William C Vaughn, Jr.
*Assistant Examiner* — Oluwaseun A Adegeye
(74) *Attorney, Agent, or Firm* — Robert D. Shedd; Jorge Tony Villabon

(57) ABSTRACT

After recording a data container, a back-pointer item is recorded, comprising a specific key and an indicator of the length of the data container. This back-pointer item can be used to jump to the beginning of the data container when reading the file backwards. Other types of coding than KLV coding are also proposed. These types of coding can be used for instance to code the back-pointer item.

5 Claims, 3 Drawing Sheets

Figure 1:
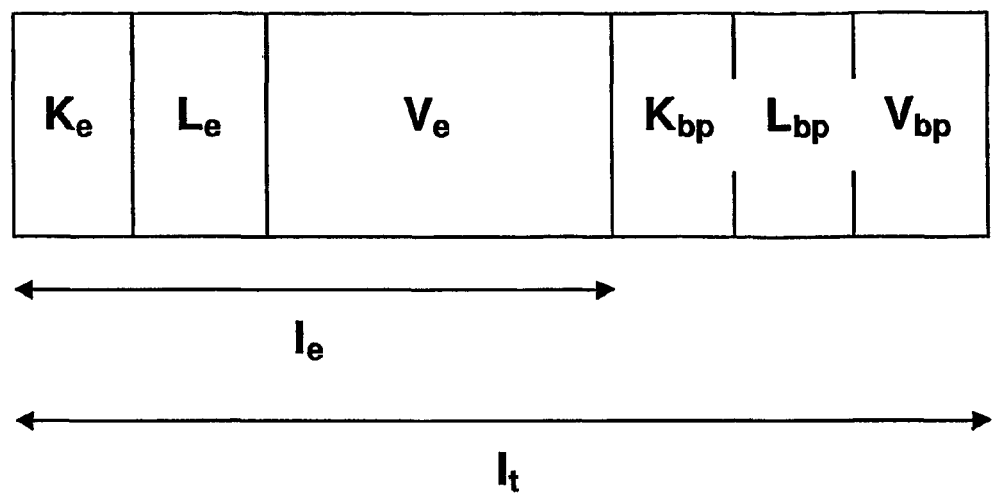

METHOD FOR RECORDING DATA, METHOD FOR RETRIEVING SETS OF DATA, DATA FILE, DATA STRUCTURE AND MEDIUM CARRYING SUCH DATA

This application claims the benefit, under 35 U.S.C. §365 of International Application PCT/EP03/50869, filed Nov. 21, 2003, which was published in accordance with PCT Article 21(2) on Jun. 24, 2004 in English and which claims the benefit of European patent application No. 02293016.8, filed Dec. 6, 2002.

The invention relates to a data structure, notably for digital video, digital audio and/or related metadata.

The broad use of digital technologies in today's world has led to various proposals to standardise the data structure of digital contents, be it video, audio or any other material. One such proposal is the Material eXchange Format (MXF).

Such formats give rules to structure the data as a whole set of data (or file) to be emitted as a digital stream or stored on a medium by a first machine. These rules allow any second machine to correctly retrieve the data when receiving the digital stream or reading the medium.

Along this scheme, it has already been proposed to use Key, Length, Value (KLV) coding as a structure for files, for instance MXF files and notably for metadata contained in MXF files. Patent application WO 02/21 845 gives an example of the possible use of KLV coding in an MXF file.

Precisely, KLV coding proposes the repetition of the following data structure (see also SMPTE standard SMPTE 336M Data Encoding Protocol Using KLV):

a standardised key, possibly indicating the type of encapsulated data, followed by;
an indicator of the length of encapsulated data, followed by;
the encapsulated data.

Inherent to its structure, this type of coding is particularly adapted when reading a file in the forward direction (from the beginning to the end), i.e. reading the key, then the length, and then the value, depending on the length. This data structure is however inoperative to simply read the file backwards as the first encountered data is the encapsulated data without any indication of its length.

To remedy this drawback, it has been proposed to use an index table so as to be able to jump to a specific block of KLV coded data, even when reading KLV blocks of unequal length. The use of an index table is however complex, notably compared to the easy access to KLV coded data in the forward direction.

The invention aims at a data structure with easy access to encapsulated data (be it either video, audio and/or metadata) in both the forward and backward directions.

To this end, the invention proposes a method for recording data, with the successive steps of:

recording a data container having a given container length;
recording a key indicative of a back-pointer;
recording a length indicator;
recording a value indicative of the container length.

Preferably, the method also has one or both following steps:

recording the length indicator;
recording the key indicative of the back-pointer.

This recording method allows to easily read backwards the sets of data with the following method concurrently proposed by the invention: a method for retrieving sets of data on a medium in a order opposite to the recording order, comprising the steps of:

accessing a first set of data;
accessing a key indicative of a back-pointer;
reading a value indicative of a container length;
accessing a second set of data using said value.

Preferably, the sets of data are KLV encoded.

The invention therefore proposes a data file comprising successive blocks, each block comprising successively:

a data container having a container length;
a back-pointer key;
a length indicator;
a value indicative of the container length, and a medium carrying such a data file.

The invention thus provides a data structure having successively:

a data container;
a back-pointer key;
a length indicator;
a value indicative of the length of the data container.

Preferably, the data structure has one or both following fields:

the length indicator;
the back-pointer key.

Thanks to the back-pointer item located immediately after the data container and indicating its length, jumping from the end of the data container (i.e. the beginning of the following data container) to the beginning of the data container is fast and simple, which makes it possible to easily read backwards in the file.

The invention also proposes KLVL and KLVLK coding.

Figure 2:
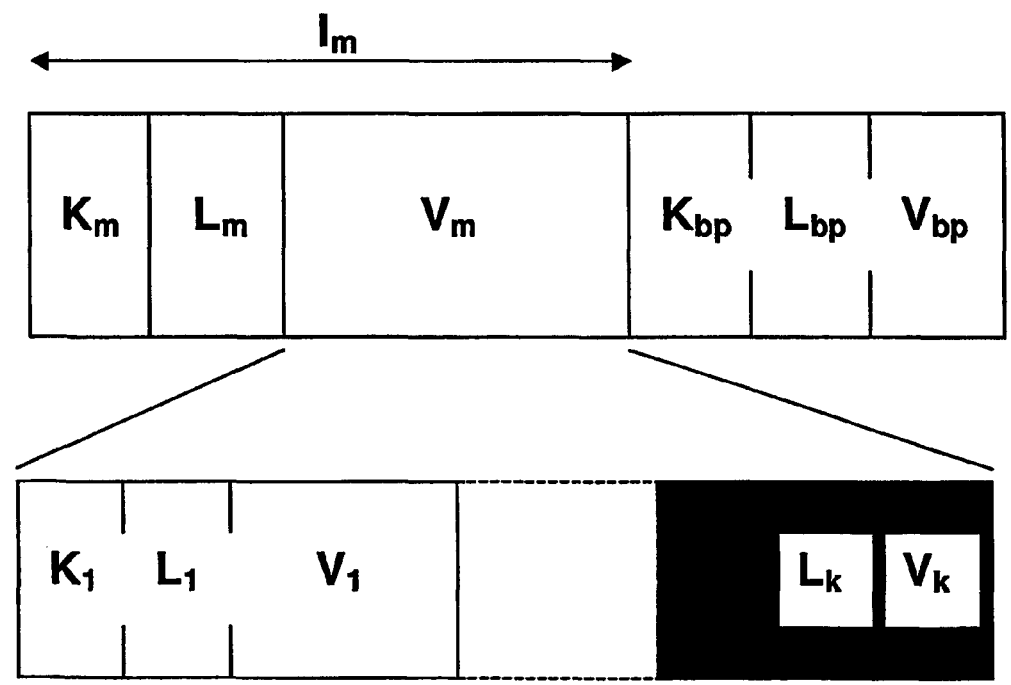
Figure 3:
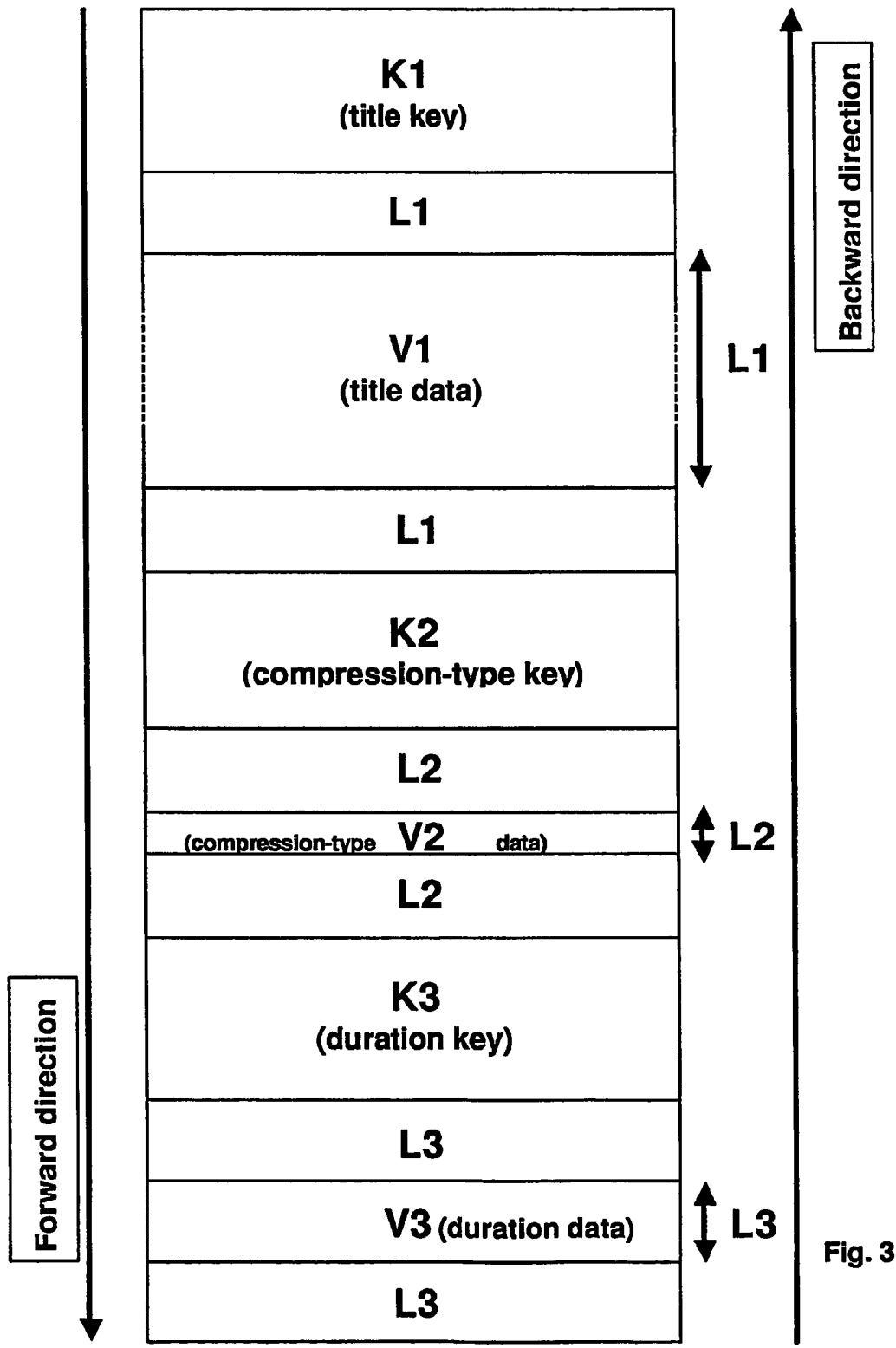
Figure 4:
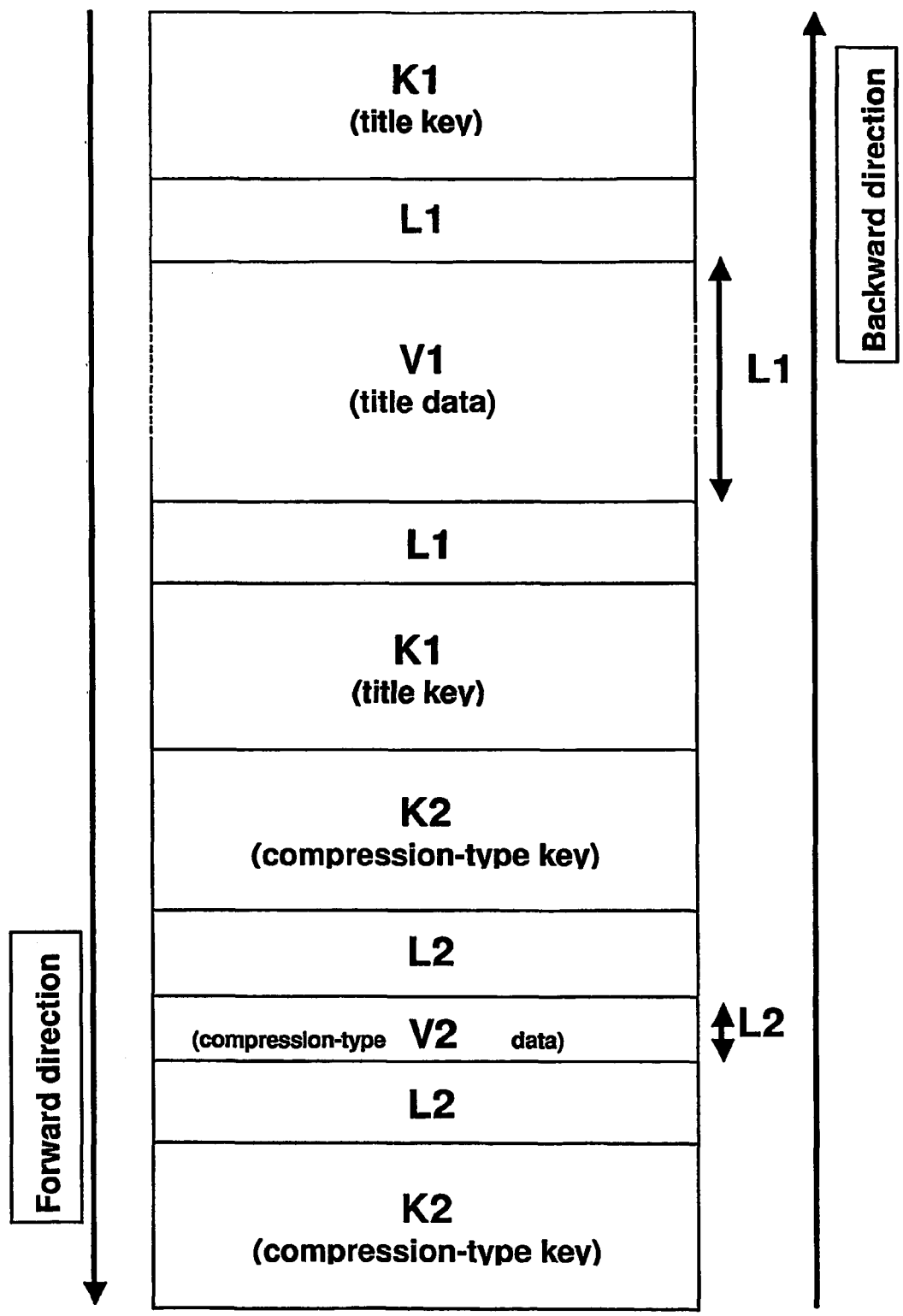

Other features of the invention will appear in light of the following description of a preferred embodiment of the invention made with reference to the appended figures where:

FIG. 1 represents a first embodiment of a data structure according to the invention;
FIG. 2 represents a second embodiment of a data structure according to the invention;
FIG. 3 represents an example of the newly-proposed KLVL coding;
FIG. 4 represents an example of the newly-proposed KLVLK coding.

FIG. 1 gives a data structure which can be used notably for recording essence data where the number of bytes per container can vary. For instance, the essence is a set of frames of compressed video data having unequal length. In this particular application, the data structure of FIG. 1 is used by a video recorder when recording a video sequence. This data structure is used in a similar fashion by a video player reproducing the video sequence.

Each frame of the video sequence is KLV encoded: it is therefore described by a key field $K_e$ indicating these data are video data, e.g. MPEG encoded video data, a length field $L_e$ indicating the length of these video data and a value field $V_e$ containing the video data (essence).

After each frame of the set, a back-pointer KLV item is inserted. This back-pointer KLV item is a relative pointer to the beginning of the preceding frame (i.e. to the preceding data container). Its function is indicated by its key $K_{bp}$ and its value $V_{bp}$ is indicative of the length of the preceding video frame (or more generally speaking of the preceding data container). For instance, its value is the length $l_e$ of the KLV coded item representing the frame ($V_{bp}=l_e$). As a possible variation, the total (cumulated) length $l$ of the essence KLV item and the back-pointer KLV item could be used instead.

As usual, the length field $L_{bp}$ represents the length of the value field $V_{bp}$. A convenient solution is to have a fixed length $L_{bp}$ for the back-pointer item, but a varying length is also possible as explained below.

When recording 3 frames F1, F2 and F3, a video recorder using the data structure of FIG. 1 will thus record the following sequence:

$K_e$ L1 F1 $K_{bp}$ $L_{bp}$ $I_1$ $K_e$ L2 F2 $K_{bp}$ $L_{bp}$ $I_2$ $K_e$ L3 F3 $K_{bp}$ $L_{bp}$ $I_3$, where Li is the length of the coded data Fi and l is the length of the KLV item ($K_e$ Li Fi) containing the coded data Fi.

These sets of data can be easily retrieved by a video player in a forward and in a backward direction as explained below.

When the video player reads the sets in a forward direction (i.e. in the same direction as the sets were recorded), the KLV structure of the file makes it easy to skip items. Notably, the back-pointers KLV items can easily be skipped by using their length field $L_{bp}$.

The video player can also easily read the sets in the backward direction. Assuming the KLV item representing frame F3 is currently accessed, access to the preceding back-pointer KLV item $K_{bp}$ $L_{bp}$ $I_2$ is immediate when the length $L_{bp}$ is fixed. By reading the value $I_2$ of the back-pointer KLV item, the video player can then immediately access the preceding KLV item representing frame F2 by jumping $I_2$ bytes backwards.

The video player can then either read the content of KLV item $K_e$ L2 F2 in order to decode frame F2 or immediately jump backwards to frame F1 by the similar use of the back-pointer item $K_{bp}$ $L_{bp}$ $I_1$.

Thanks to the use of the back-pointer items, fast jumping from frame to frame backwards is made possible, with the option each time to decode the frame or not. Back-pointer items are therefore particularly useful to allow a fast-backward mode displaying only some of the encountered pictures.

It should be noticed that the back-pointers provide this advantage even when their length $L_{bp}$ is not fixed. In this case, the preceding back-pointer KLV item can be accessed by searching backwards for the key $K_{bp}$. This is of course much faster than searching backwards for the preceding essence key $K_e$ as the back-pointer KLV item is much shorter than the frame (essence) KLV item.

It is also possible to code the back-pointer with KLVL coding or KLVLK coding as described below. As explained, this types of coding allow to read the item in the forward and in the backward direction.

In the above example, the use of a back-pointer item has been described in association with essence data. Of course, such a back-pointer item can similarly be used with metadata or any other types of data.

FIG. 2 gives an example of the use of a back-pointer item associated with metadata.

A set of k metadata $V_1$, . . . , $V_k$ are KLV coded and combined as the value field $V_m$ of a KLV item generally denominated "metadata set KLV item". The metadata set item has a specific key field $K_m$ and a length field indicating the length of the value field $V_m$.

A back-pointer KLV item $K_{bp}L_{bp}V_{bp}$ immediately follows the metadata set KLV item $K_m L_m V_m$. The key $K_{bp}$ indicates that the present KLV item is a relative pointer to the start of the preceding KLV item (or data container), here to the start of the metadata set. The length field $L_{bp}$ indicates the length of the value field $V_{bp}$, which is in turn indicative of the length $I_m$ of the preceding KLV item, here the metadata set.

When the data are recorded as represented from left to right (forward direction) on FIG. 2 by a recorder, they can easily be accessed (and possibly read) by a player both in the forward and in the backward direction as explained now.

In the forward direction, $K_m$ is first accessed, informing the player that the accessed set of data is a metadata set. The player can either use the following length field $L_m$ in order to skip the metadata set, or read the value field $V_m$ in order to actually access one or several metadata.

If the metadata set is skipped, the player finds the back-pointer KLV item, identifies it as such thanks to its key $K_{bp}$ and skips it thanks to the length field $L_{bp}$.

On the other hand, if the value field $V_m$ is actually read, the player can easily access the metadata $V_1$, . . . , $V_k$ one by one in the forward direction thanks to their KLV structure. Then, the player accesses the back-pointer KLV item and skips it as described above.

In the backward direction, the player has to identify which data compose the back-pointer item. As described above, a convenient solution is to decide beforehand that back-pointer items have a fixed length. The player can in this case go this fixed length in the backward direction and thus access key $K_{bp}$.

Even in cases where the length of the back-pointer item may vary, the player can easily access the key $K_{bp}$ by seeking it backwards. It is of course much faster, much easier and much more reliable to seek for a given key ($K_{bp}$) backwards than to try to read the metadata set backwards (which would consist in seeking every possible key in a larger amount of data, knowing that new metadata with corresponding new key can be introduced).

As previously explained, the back-pointer can also be KLVL or KLVLK encoded.

When the back-pointer item is Identified, its value field $V_{bp}$ is read with the value $I_m$ and the player consequently jumps $I_m$ bytes backwards, thereby immediately accessing the metadata set KLV item $K_m L_m V_m$.

The player can then either read the metadata set item to acquire some of the metadata (in the forward direction, as explained above), or ignore the metadata set and continue reading backwards accessing to a new back-pointer item as $K_{bp}$ $L_{bp}$ $I_3$ on FIG. 1.

As a possible alternative to FIG. 2, the back-pointer item $K_{bp}L_{bp}V_{bp}$ could be considered as part of the metadata set $K_m L_m V_m$. The principles of operation would remain the same, both in the forward and in the backward direction. In this case however, if the value field $V_{bp}$ still represents the length of the whole metadata set item, the player has to deduce the length of the back-pointer item itself from the value $V_{bp}$ before jumping backwards. Other variations are workable as long as the value field $V_{bp}$ is indicative of the byte length between the start of the data container (here key $K_m$) and the back-pointer item (key $K_{bp}$).

The back-pointer item has been designed in the previous example to jump backwards over a whole metadata set, but it is naturally possible to provide back-pointer items to jump backwards over subsets of metadata within the metadata set.

FIG. 1 and FIG. 2 propose the use of a back-pointer item to greatly simplify backwards reading of a set of data, notably KLV coded data in an MXF file.

Advantageously, a header of this file has a flag (e.g. a bit) indicating whether or not back-pointer items are used in the file or not. Other information, as for instance the use of KLVL or KLVLK coding, or the fixed length of the back-pointer item (if existing), could also be included in the file header. The header can be attached as metadata to the file.

Following is a description of KLVL coding and KLVLK coding which are also proposed by the invention. Although they preferably apply to back-pointer items only as in the above description, they could apply to any kind of data.

FIG. 3 represents KLVL coding of several metadata items given as an example of KLVL coding. Each item represents a given information (or parameter) having a value $V_1$. In order to be transported and retrieved, each set of data is encapsulated as described below.

A key Ki (e.g. coded on 16 bytes) is determined to indicate which kind of information is represented by the item. The length (e.g. in bytes) of data representing the information or value Vi is also determined as length indicator Li (e.g. coded on 4 bytes).

When recording the metadata, the recorder writes for each item the following sequence (in the indicated order): Ki Li Vi Li. With the above-byte-length example, the sequence Ki Li Vi Li is (24+Li)-byte-long.

In the example depicted on FIG. 3, the 3 following pieces (items) of metadata information are considered:
title of the recording (key K1) coded on 256 bytes (L1 means 256) defined in data V1;
video compression technique (key K2) coded on 2 bytes (L2 means 2) defined in data V2;
duration of the recording in seconds (key K3) coded on 4 bytes (L3 means 4) defined in data V3.

The video recorder will record these metadata according to the following sequence: K1L1V1L1K2L2V2L2K3L3V3L3 as illustrated on FIG. 3.

The metadata are of course written included in a larger structure as provided by the Material eXchange Format, for instance as described in patent application WO 02/21 845. However, KLV coding is replaced by KLVL coding for some items at least.

When another machine reads the file, the metadata can be accessed.

If the audio-video file is read in the forward direction (i.e. in the same direction as when recorded), key K1 is first read, then length L1 is read allowing to determine the byte length of data V1 and thus to read value V1. The 4 bytes (L1) following V1 are ignored and K2 can be accessed. Further retrieval of metadata can be made in a similar fashion.

If the audio-video file is read in the backward direction, length L3 is first accessed. This gives immediately the length of bytes to be read as value V3. Once V3 is read, the following 4 bytes in backward direction (also representing L3) are ignored and K3 is then accessed. V3 and K3 are thus immediately determined when reading backwards without the need for an index table.

Of course, further retrieval of metadata in the backward direction carries on with the same simple scheme: L2 is read, thereby giving the possibility to read V2; the occurrence of L2 between V2 and K2 is ignored and K2 is read. Lastly, L1 is read, thereby giving immediate access to value L1 and by skipping the 4 bytes of L1 to key K1.

As shown by this example, KLVL coding allows easy retrieval of the encapsulated data (V) when the KLVL sequence is read either in the forward or in the backward direction.

As a possible variation, when reading the length indicator field L for a second time (either in the forward or in the backward direction), it can be compared to the first-read length indicator (instead of simply ignoring the second-read length indicator as described above). This allows to check if the file has the expected format and no errors, and whether the proposed algorithm to skip backwards data is still synchronised with the KLVL coding of the file.

In a comparable way, KLVLK coding is obtained by recording an item Vi as the following sequence:
Ki Li Vi Li Ki.

FIG. 4 represents KLVLK coding of several metadata items given as an example of KLVLK coding. Each item represents a given information (or parameter) having a value Vi. In order to be transported and retrieved, each set of data is encapsulated as described below.

A key Ki (e.g. coded on 16 bytes) is determined to indicate which kind of information is represented by the item. The length (e.g. in bytes) of data representing the information or value Vi is also determined as length indicator Li (e.g. coded on 4 bytes).

When recording the metadata, the recorder writes for each item the following sequence (in the indicated order): Ki Li Vi Li Ki. With the above-byte-length example, the sequence Ki Li Vi Li Ki is (40+Li)-byte-long.

In the example depicted on FIG. 4, the 2 following pieces (items) of metadata information are considered:
title of the recording (key K1) coded on 256 bytes (L1 means 256) defined in data V1;
video compression technique (key K2) coded on 2 bytes (L2 means 2) defined in data V2.

The video recorder will record these metadata according to the following sequence: K1L1V1L1K1K2L2V2L2K2 as illustrated on FIG. 4.

When another machine reads the file, the metadata can be accessed.

If the audio-video file is read in the forward direction (i.e. in the same direction as when recorded), key K1 is first read, then length L1 is read allowing to determine the byte length of data V1 and thus to read value V1. The 20 bytes (L1K1) following V1 are ignored and K2 can be accessed. Further retrieval of metadata can be made in a similar fashion.

If the audio-video file is read in the backward direction, key K2 is first accessed, then length L2 is read allowing to determine the byte length of data V2 and thus to read value V2. The further 20 bytes (L2K2) can be ignored.

Further retrieval of metadata in the backward direction carries on with the same scheme. In fact, as recording is symmetrical with KLVLK coding, reading backwards uses the same algorithm as reading forwards and is therefore as simple as reading forwards.

As a possible variation, when reading the length indicator L and key K fields for a second time (either in the forward or in the backward direction), it can be compared to the first-read length and key indicators (instead of simply ignoring them as described above). This allows to check if the file has the expected format and no errors, and whether the proposed algorithm is still synchronised with the KLVLK coding of the file.

The invention is not limited to the above-described embodiments. Variations to these embodiments can be made without departing from the scope of the invention.

The invention claimed is:

1. Method for recording encapsulated data on a medium in a recording order, which can be retrieved in an order opposite to the recording order, said method being implemented on a video recorder and comprising the steps of:
recording on the medium in a recording order, using said video recorder, as a data container, a KLV coded item which comprises a first key indicating type of the encapsulated data, a first length indicator of the length of the encapsulated data, and the encapsulated data;
recording on the medium in a recording order using said video recorder following the KLV coded item as a relative pointer to the beginning of the preceding data container, a back-pointer KLV coded item having a back pointer length and comprising a second key indicating other encapsulated data being of a back pointer type and a second length indicator of the length of the other encapsulated data and having as the other encapsulated data, a length value of the KLV coded item or a cumulated length value of said length of the KLV coded item and the back pointer length;

repeating the recording steps.

2. Method according to claim 1, further comprising:

re-recording the second length indicator after the back pointer KLV coded item.

3. Method according to claim 2, further comprising:

re-recording the second key after the second length indicator.

4. Method for retrieving on a video player a KLV coded item, which was recorded according to claim 1, having a KLV item length on a medium in an order opposite to the recording order from a currently accessed KLV item, said method comprising the steps of:

accessing, using said video player, the second key indicating encapsulated data as being of a back pointer type, and wherein the encapsulated data has a fixed length;

reading, using said video player, the other encapsulated data indicating the cumulated length of said KLV item length and said back pointer length; and accessing, using said video player, the KLV item by jumping a number of bytes further backwards wherein the number of bytes equals said cumulated length value.

5. Method for retrieving on a video player a KLV coded item, which was recorded according to claim 1, having a KLV item length on a medium, in an order opposite to the recording order from a currently accessed KLV item, the method comprising the steps of:

accessing, using said video player, the second key indicating encapsulated data as being of a back-pointer type, and wherein the encapsulated data has a non-fixed length;

reading, using said video player, the second length indicator of the length of the encapsulated data prior to reading the value;

reading, using said video player, the other encapsulated data indicating the cumulated length of said KLV item length and said back pointer length; and accessing, using said video player, the KLV item by jumping a number of bytes further backwards wherein the number of bytes equals said cumulated length value.

* * * * *